United States Patent [19]
Haley et al.

[11] 3,777,326
[45] Dec. 11, 1973

[54] VEHICLE WASHING APPARATUS

[75] Inventors: David M. Haley, Glendale; Richard P. Bergantzel, Granada Hills, both of Calif.

[73] Assignee: California Car Wash Systems, Inc., Sun Valley, Calif.

[22] Filed: Dec. 10, 1971

[21] Appl. No.: 206,804

[52] U.S. Cl. .............................. 15/21 D, 15/DIG. 2
[51] Int. Cl. ............................................... B60s 3/06
[58] Field of Search ..................... 15/DIG. 2, 21 D, 15/21 E, 53, 97

[56] References Cited
UNITED STATES PATENTS

| | | | |
|---|---|---|---|
| 3,304,565 | 2/1967 | Fuhring | 15/DIG. 2 |
| 3,579,700 | 8/1969 | Haley | 15/21 E |
| 3,581,334 | 6/1971 | Follis | 15/21 D |
| 3,626,537 | 12/1971 | Wilson | 15/21 D |
| 3,662,417 | 5/1972 | Fuhring | 15/21 D |

Primary Examiner—Edward L. Roberts
Attorney—Vern Schooley et al.

[57] ABSTRACT

Parallelogrammatic vehicle washing apparatus for washing a vehicle moving along a predetermined path relative to the apparatus and including a pivotally supported carrier arm normally projecting transversely of the predetermined path. A vertically extending parallelogrammatic linkage is carried on its upper end from the free end of the carrier arm and has a brush supported from the lower extremity thereof for rotation about a vertical axis. Drive means is provided for rotating the brush and controlling movement of the carrier arm and parallelogrammatic linkage for normally maintaining the linkage extended with the brush disposed in the vehicle path and responsive to engagement thereof by the front of the vehicle to be washed to retract the parallelogrammatic linkage while the free end of the carrier arm moves forwardly to draw the brush across the front of the forwardly moving car and to then swing the free end of the carrier arm rearwardly, while extending the linkage, to move the brush rearwardly along the side of the vehicle and responsive to the brush clearing the rear corner of the vehicle to move the free end of the carrier arm forwardly to move the brush inwardly along the rear of the car and forwardly therewith.

13 Claims, 8 Drawing Figures

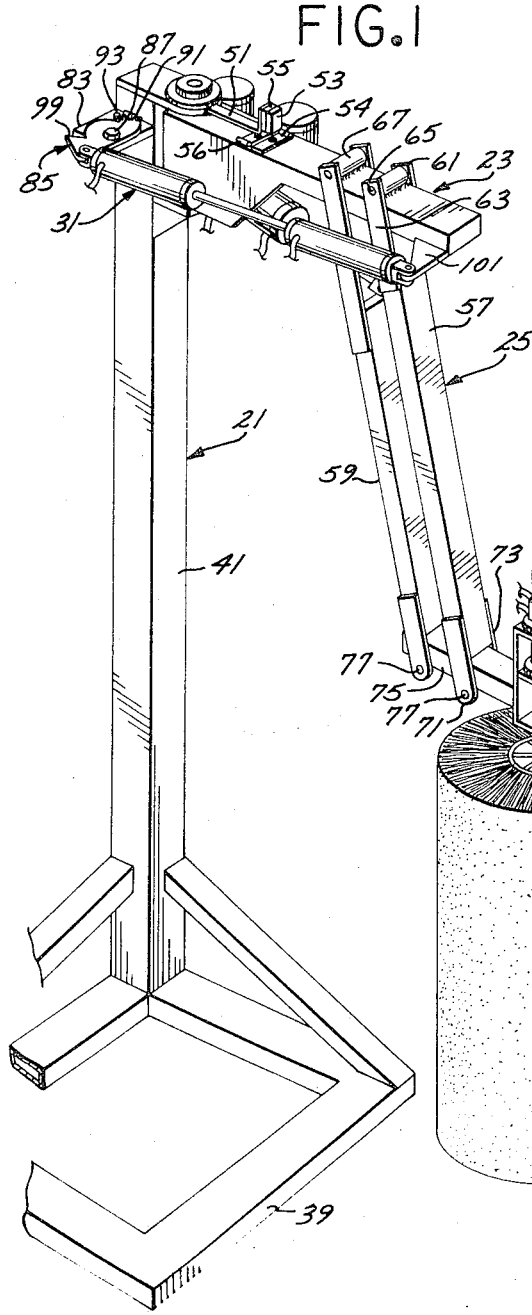
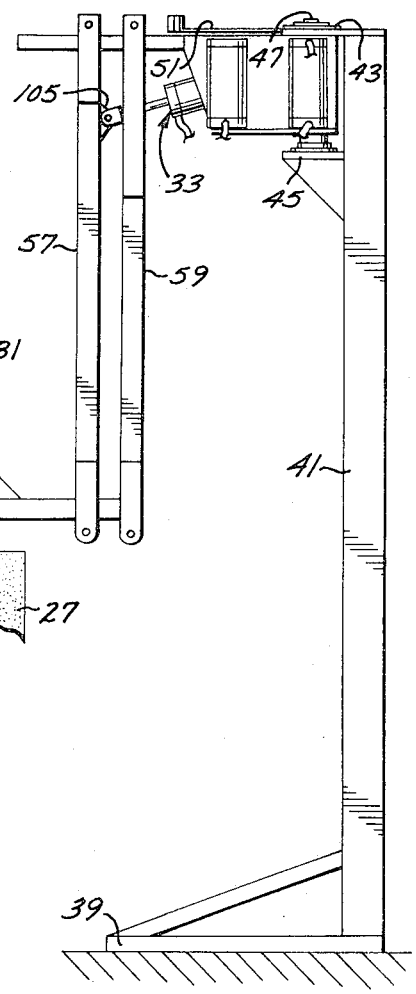
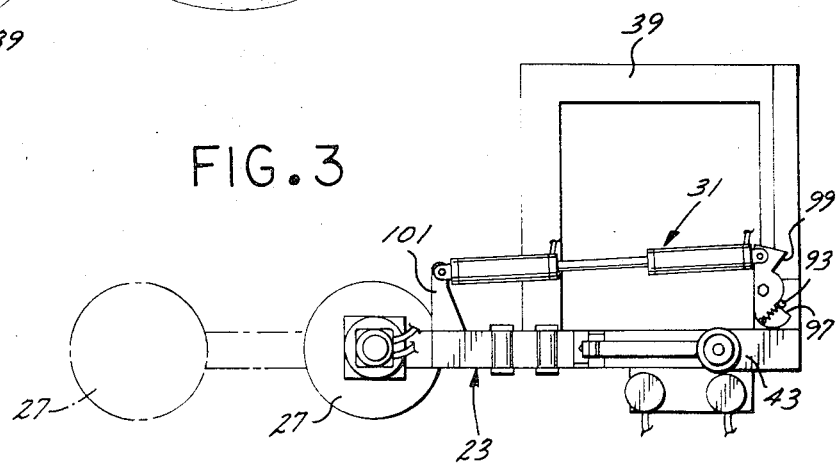

3,777,326

VEHICLE WASHING APPARATUS

BACKGROUND OF THE INVENTION

1. Field of the Invention

The vehicle washing apparatus of present invention relates to a device for automatically washing a vehicle as it moves along a predetermined path.

2. Description of the Prior Art

Numerous efforts have been made to provide an economical-to-manufacture and convenient-to-operate car washing apparatus that will automatically wash the front side and rear of a vehicle. One such device includes a pair of articulated horizontal overhead arms which project over the path of a car and support a brush from the free end thereof in a pendulum manner for rotation about a vertical axis. A vehicle is then conveyed along such path and the arm will articulate to initially move the brush forwardly and across the front of the car and then rearwardly along the side of the car to the rear corner thereof and, finally, inwardly along the rear of the forwardly moving car. A device of this type is shown in U.S. Pat. No. 3,581,334. Devices of this type suffer the shortcoming that relatively massive and long arms are required to withstand the forces applied to the brush and to provide for sufficient brush movement to adequately wash cars moving therepast.

Other car washing devices have been proposed which include a roll-over type frame which is rolled over a stationary car and has brushes supported therefrom by means of parallelogrammatic arms to maintain such brushes oriented for rotation about a vertical axis as such brushes wash the front side and rear of the car. However, devices of this type suffer the shortcoming that the support frame must be stopped when the brushes engage the front or rear of the car and must remain stopped while such brushes wash the front or rear of the car thereby consuming considerable time and significantly reducing the rate at which cars may be washed. A roll-over car washing device of this type is shown in U.S. Pat. No. 3,579,700.

SUMMARY OF THE INVENTION

The car washing apparatus of present invention is characterized by a pivotal carrier arm that normally projects transversely of the car path and has the upper end of a vertically extending parallelogrammatic frame supported from the free end thereof. A brush is supported from the lower extremity of the parallelogrammatic frame for disposition in the path of the car and rotation about a vertical axis. Control means is provided for rotating the brush and controlling movement of the carrier arm and linkage to cause the linkage to retract when the brush is engaged by the front of a forwardly moving car to draw the brush across the front of such car as the carrier arm moves forwardly and to then extend such linkage and move the arm rearwardly to move the brush along the side of a moving car, and, finally, swing the carrier arm forwardly to move the brush inwardly and forwardly across the rear of the car.

The objects and advantages of the present invention will become apparent from a consideration of the following detailed description when taken in conjunction with the accompanying drawings.

DESCRIPTION OF THE DRAWINGS

FIG. 1 is a perspective view of a parallelogrammatic vehicle washing apparatus embodying the present invention;

FIG. 2 is a side view of the vehicle washing apparatus shown in FIG. 1;

FIG. 3 is a top plan view of the vehicle washing apparatus shown in FIG. 2;

DESCRIPTION OF THE PREFERRED EMBODIMENT

Figure 4:
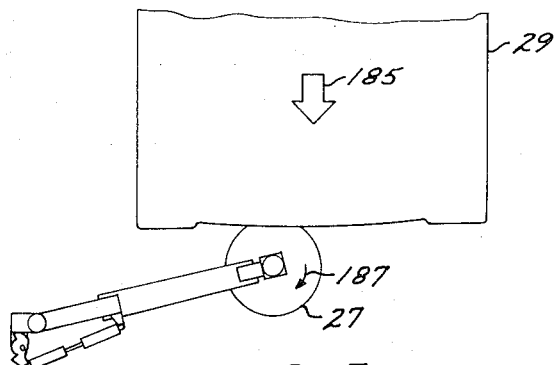
FIGS. 4–7 are schematic plan views of the car washing apparatus shown in FIG. 1 during operation thereof.
Figure 6:
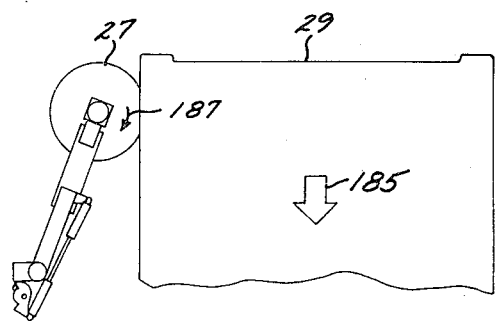
Figure 7:
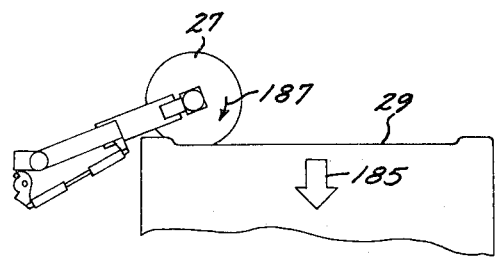

Referring to FIG. 1, the vehicle washing apparatus of present invention includes, generally, a stationary stand 21 disposed at one side of the path of a vehicle to be washed and carrying a horizontally extending pivotal carrier arm 23 from the upper end thereof for normal projection transversely of the vehicle path. A vertically extending parallelogrammatic linkage 25 is pivotally mounted at its upper extremity to be free and of the carrier arm 23 and projects generally downwardly and inwardly to mount a brush 27 on the lower end thereof for rotation about a vertical axis. Still speaking generally, a piston assembly 31 controls movement of the carrier arm 23. A second piston assembly 33 controls retraction and extension of the parallelogrammatic linkage 25 to normally maintain the carrier arm 23 projecting transversely of the path of the vehicle 29 to be washed as shown in FIG. 4 and the linkage 25 extended to dispose the brush 27 in the vehicle path. When the brush 27 is engaged by the front of the vehicle 29, pressure on the piston assembly 31 is released to enable the linkage 25 to retract and move the brush 27 outwardly across the front of the vehicle while the carrier arm pivots forwardly until such brush clears the front fender of the vehicle. As the brush 27 clears the front fender of the car, the piston assembly 31 is actuated to push the free extremity of the carrier arm 23 rearwardly while the piston 33 extends the linkage 25 to move the brush 27 rearwardly along the side of the forwardly moving car. When the brush 27 clears the rear corner of the car as shown in FIG. 6, the arm 23 is rotated forwardly to move the brush 27 inwardly and forwardly with the rear of the car to complete the washing cycle.

The stand 21 includes a horizontal base 39 having a vertical post 41 projecting upwardly thereform and having a pair of vertically spaced apart mounting plates 43 and 45 (FIG. 2) projecting inwardly therefrom. One end of the carrier arm 23 is received between the mounting flanges 43 and 45 and has a vertically projecting pivot pin 47 extending therethrough to form an axis about which such arm rotates. Referring to FIG. 2, a horizontal projecting switch mounting arm 51 is mounted on its outer extremity from the support post 41 and projects inwardly over the top of the carrier arm 23 to support forwardly and rearwardly activatable switches 53 and 55, respectively. Such switches 53 and 55 are selectively actuated by respective switch actuators 54 and 56 mounted on the top side of the arm 23.

The parallelogrammatic linkage 25 includes a pair of parallel arms 57 and 59 which are formed on their upper extremities with upwardly projecting spaced apart brackets 61 and 63 that straddle the free extremity of the carrier arm 23 and have respective horizontally projecting pivot pins 65 projecting therethrough and journaled through respective cylindrical bearing 67 welded to the top of such arm 23. Similarly, the respective arms 57 and 59 include downwardly projecting brackets 71 and 73 on the respective lower extremities. Such brackets are spaced apart and straddle a horizontally extending mounting arm 75 and have pivot pins 77 projecting therethrough to secure such arms to bearings mounted underneath the arm 75. A vertical bearing assembly 79 is mounted on the free end of the arm 75 and has the axle of the brush 27 affixed thereto. The bearing assembly 79 mounts a drive motor 81 which rotates the brush 27.

It will be appreciated that the arms 57, 59, 23 and 75 cooperate to form an articulated parallelogram which acts to rotate the axis of the brush 27 about the pivot pins 77 as the arms 57 and 59 swing inwardly and outwardly to thereby maintain the brush 27 in a vertical orientation for proper washing of the vertically extending front side and rear surfaces of a car 29.

Referring to FIG. 1, the carrier arm piston assembly 31 is mounted on one end to a forwardly projecting flange 83 mounted on the support post 41, such piston assembly being mounted by means of a take-up cam, generally designated 85, which is mounted from the flange 83 by means of a pivot pin 87. The cam 85 is biased counterclockwise as viewed in FIG. 1 by means of a tension spring 91 that is secured on one end to such cam and on its opposite end to a stop pin 93 carried from the flange 83. Counterclockwise rotation of such cam is limited by means of a radially projecting surface 97 that abuts the stop pin 93 and clockwise rotation of such cam is limited by means of an abutment surface 99. The end of the piston assembly 31 opposite the cam 85 is mounted on a forwardly projecting mounting bracket 101 mounted to the front side of the free extremity of the carrier arm 23.

Referring to FIG. 2, one extremity of the linkage control cylinder 33 is connected to the parallel arms 57 by means of a mounting bracket 105 and the opposite end of such piston is mounted from the base of the carrier arm 23.

Figure 8:
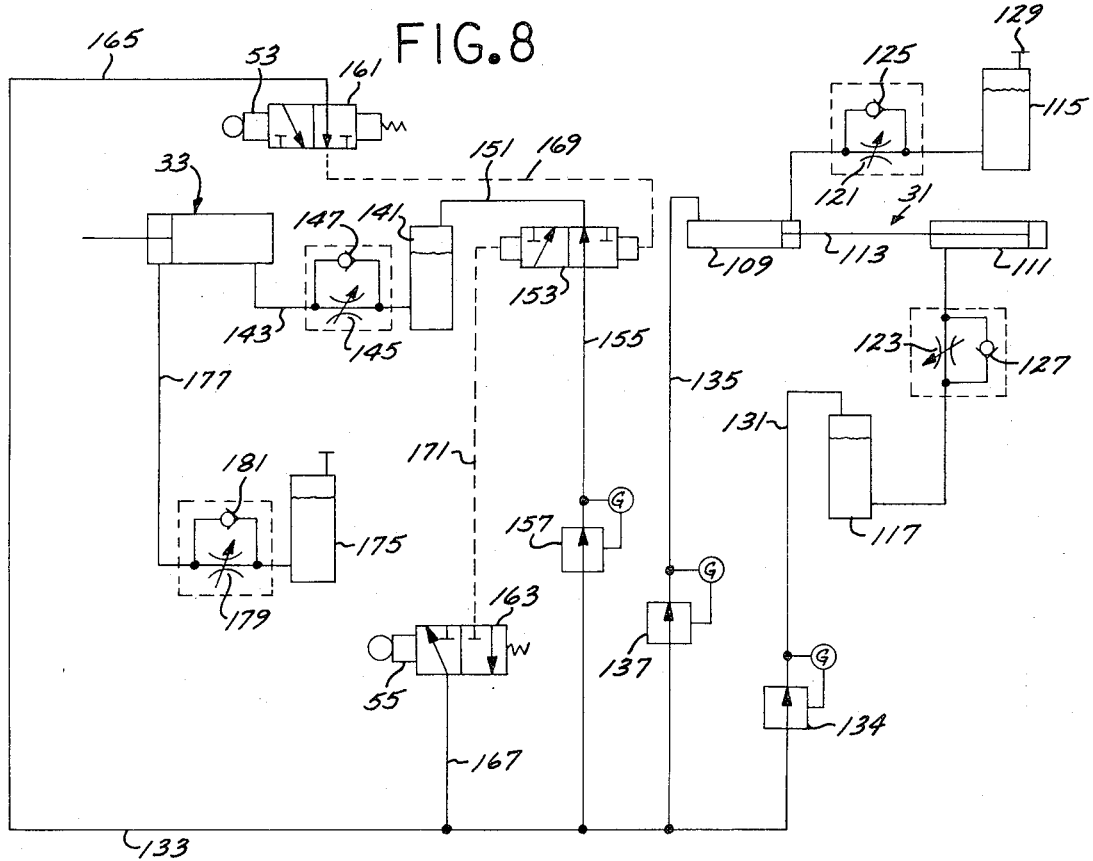
FIG. 8 is a diagrammatic view of a hydraulic-pneumatic control system included in the vehicle washing apparatus shown in FIG. 1.

Referring to FIG. 8, with the carrier arm control piston assembly 31 is included a pair of separate pistons 109 and 111 which are connected together by means of a common piston rod 113. Respective oil reservoirs 115 and 117 are connected to the respective rod ends of such respective pistons 109 and 111 by means of conduits including adjustable orifices 121 and 123 respectively, such orifices having parallel bypass check valves 125 and 127 connected thereacross. The oil reservoir 115 is vented at 129 and the reservoir 117 has an air pressurization conduit 131 connected to the top thereof, such conduit leading from an air supply conduit 133 which is connected with an air compressor (not shown) and having a pressure regulator 134 therein. The blind end of the cylinder 109 is connected with the air conduit 133 by means of a conduit 135 including a pressure regulator 137.

The blind end of the linkage control piston 33 is connected with an air-over-oil reservoir 141 by means of a conduit 143 including an adjustable orifice 145 which has a one way check valve 147 connected thereacross. Connected with the top of the air-over-oil reservoir 141 is an air conduit 151 which has air thereto controlled by means of a two way control valve 153 that has air supplied thereto by means of a conduit 155 leading from the supply conduit 133, such conduit 155 including a pressure regulator 157.

Positioning of the control valve 153 between venting and pressurization of the cylinder 33 is controlled by the one way switches 53 and 55 which control respective pilot valves 161 and 163 which are connected with the pressure conduit 133 by means of respective conduits 165 and 167. The outlets of such pilot valves 161 and 163 are connected with the opposite ends of the control valve 153 by means of respective lines 169 and 171. Still referring to FIG. 8, the rod end of the linkage control piston 33 is connected with an oil reservoir 175 by means of a conduit 177 including an adjustable orifice 179 which has a one way check valve 181 connected thereacross.

In operation, the parallelogrammatic vehicle washing apparatus of present invention may be installed in a tunnel-type car wash where the cars to be washed are brought therepast by means of a conveyor (not shown). Since the carrier arm 23 does not extend any substantial distance over the car path, a pair of vehicle washing devices of present invention may be arranged directly across from one another on opposite sides of the car path to locate the brushes 27 and 27' adjacent one another near the center of the car path as shown in FIG. 4.

While the vehicle washing apparatus so installed, the vehcile 29 to be washed may be coupled with the conveyor (not shown) and will be conveyed forwardly in the direction of the directional arrow 185 shown in FIG. 4 to engage the central front of the vehicle with the brush 27, it being realized that the brush is rotated in clockwise direction by the motor 81 as indicated by the directional arrow 187. Engagement of the front of the vehicle with the brush 27 will carry such brush slightly forwardly thereby carrying the free extremity of the carrier arm 23 forwardly. This initiates rotation of the take-up cam 85 clockwise as viewed in FIG. 1 against the bias of the spring 91 until the radial abutment surface 99 engages the stop pin 93. Continued forward movement of the brush 27 commences retraction of the cylinder 109 against the pressure from the pressure conduit 135. As the carrier arm 23 moves forwardly under the switches 53 and 55, the actuator 54 will actuate the switch 53 to energize the pilot valve 161 to shift the spool in the control valve 153 to the vent position thereby venting the blind end of the piston 33 by means of oil rushing from such piston and to the conduit 143 and check valve 147 to accumulate in the reservoir 141 as vent air is expelled therefrom through the conduit 151 and the vent of the control valve 153. Such venting of the linkage control piston 33 enables such piston to be retracted under the combined weight of the control linkage 25 and brush 27, along with the frictional force produced by rotation of the brush 27 on the front of the vehicle 29. Consequently, such brush 27 will be drawn across the front of the car to the position shown in FIG. 5 as the cylinder 33 retracts and such retraction will draw oil from the reservoir 175 through check valve 181 and conduit 177 into the rod end of such cylinder in preparation for subsequent dampening extension of such cylinder as will be described hereinafter.

Figure 5:
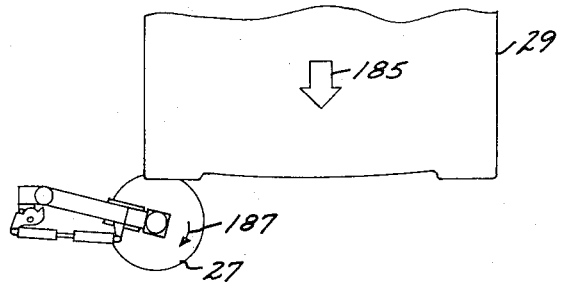

Referring to FIGS. 1 and 8, as the carrier arm 23 is rotated forwardly while the brush moves across the front of the forwardly moving vehicle 29 from the position shown in FIG. 4 to the position shown in FIG. 5, the piston of the cylinder 109 will be retracted against the pressure in the blind end of such cylinder. As the brush 27 clears the front corner of the vehicle 29 and subsequently commences rearward travel along the side thereof past its neutral position such piston will commence extending. As the carrier arm 23 rotates rearwardly under the one way switches 53 and 55, the actuator 56 will actuate switch 55 to energize the pilot valve 153 and shift the spool in the control valve 153 to the pressurizing position to thereby render the air-over-oil reservoir 141 communicative with the pressure supply conduit 133 to initiate controlled flow of oil through the orifice 145 and into the blind end of the cylinder 33 to commence extension of such cylinder. The rate of such extension is controlled by the rate of flow through the adjustable feed and outlet orifices 145 and 179, respectively, which dictates the rate at which oil is expelled from the rod end of the cylinder 33. Extension of the cylinder 33 swings the lower extremity of the parallelogrammatic frame 25 to its extended position thereby cooperating with the frictional force developed by the brush 27 against the side of the car to move such brush rearwardly along the side of the car thus fully extending the pistons 109 and 111 of the arm control assembly 31. This positions the brush at its full rearward position shown in FIG. 6. When the rear corner of the vehicle 29 clears the brush 27, travel of such brush inwardly across the rear of the car will be commenced as a result of the pressure on the blind end of the cylinder 111 tending to retract such cylinder thereby pulling the free extremity of the carrier arm 23 forwardly and consequently moving the brush 27 forwardly and across the rear of the vehicle 29 as such vehicle continues its forward travel. Such forward movement of the brush 27 will be continued until the carrier arm 23 reaches it neutral position shown in FIG. 4, at which time the cylinder 111 is fully retracted and the cylinder 109 fully extended.

It will be apprecitated that the parallelogrammatic linkage 25 operates to maintain the axis of the side brush 27 projecting vertically as such brush is retracted across the front of the car and during travel thereof rearwardly along the car and then inwardly across the rear of such car. The links 57 and 59 cooperate to support the weight of the brush as well as providing for rectilinear movement of the brush frame 75 upon rotation of such linkage to maintain the desired brush orientation.

From the foregoing, it will be apparent that the parallelogrammatic vehicle washing apparatus of present invention provides a rapid and convenient means for washing vehicles as they move continuously therepast. Also, only two brushes are required for washing the front side and rear of the vehicle and such brushes may be mounted directly opposite each other on opposite sides of the vehicle path and require relatively little forward and rearward travel thereby minimizing the length of car path that must be allocated to such apparatus. This feature is particularly important in areas of where only small lots are available for car wash installations. Additionally, the relatively few parts required for construction and the simplicity of manufacture provides a relatively inexpensive apparatus that is inexpensive to store and ship.

Various modifications and changes may be made with regard to the foregoing detailed description without departing from the spirit of the present invention.

We claim:

1. Vehicle washing apparatus for washing a vehicle as it moves along a predetermined path relative thereto and comprising:
   a support stand adjacent said path;
   carrier means mounted on said support stand and movable forwardly and rearwardly relative to said path;
   brush means normally disposed in said path for rotation about a vertically extending axis;
   vertically extending pivotally connected parallelogrammatic linkage means carried on its upper extremity from said carrier means and mounting said brush means from its lower extremity; and
   drive means for rotating said brush means and controlling said carrier and linkage to cause said carrier means when said brush means is engaged by the front of said vehicle to move said lower extremity of said linkage forward along said path while retracting said linkage to move said brush means across the front of said vehicle to one side of said path while relative movement between said vehicle and stand continues and to then cause said carrier to move said lower extremity of said linkage rearwardly along said path to move said brush means rearwardly along the side of said vehicle and then cause said linkage to move said brush means inwardly across the rear of said vehicle while said carrier moves said lower extremity forward along said path to maintain said brush means in contact with the rear of said vehicle.

2. Vehicle washing apparatus as set forth in claim 1 wherein:
   said drive means includes control means responsive to engagement of said brush means by the front of said vehicle to retract said linkage to move said brush means across the front of said vehicle.

3. Vehicle washing apparatus as set forth in claim 1 wherein:
   said parallelogrammatic linkage means is formed by a single parallelogrammatic frame.

4. Vehicle washing apparatus as set forth in claim 1 wherein:
   said drive means includes control means normally extending said linkage means to hold said brush means in said normal position and responsive to forward movement of said brush means from said normal position to release said linkage for retraction of said brush to be moved across the front of said vehicle.

5. Vehicle washing apparatus as set forth in claim 1 wherein:
   said carrier is in the form of a transverse arm pivotally carried one extremity from said stand and normally projecting transversely of said vehicle path and rotatable to a forward position to carry said brush means to a full forward position and to a rearward position to move said brush to its full rearward position.

6. Vehicle washing apparatus as set forth in claim 1 wherein:
   said linkage means normally projects generally downwardly and inwardly and said apparatus includes:
   control means for normally holding said linkage means projecting downwardly and inwardly and responsive to forward movement of said brush from said normal position to release said linkage means to free said linkage means to retract to a generally vertical position to move said brush means across the front of said vehicle and forwardly therewith to a full forward position and further responsive to rearward movement of said brush rearwardly from said full forward position to extend said linkage means.

7. Vehicle washing apparatus as set forth in claim 1 wherein:
said carrier means includes a carrier arm pivotally mounted on one end from said support stand and having said parallelogrammatic linkage mounted from the free end thereof; and
said drive means includes biasing means connected to said carrier arm for urging said carrier arm rearwardly.

8. Vehicle washing apparatus as set forth in claim 7 wherein:
said drive means includes piston means connected with said linkage means and responsive to movement of said carrier arm rearwardly of said neutral position to urge said linkage means to its extended position.

9. Vehicle washing apparatus as set forth in claim 7 wherein:
said biasing means includes fluid cylinder means.

10. Vehicle washing apparatus as set forth in claim 7 wherein:
said drive means includes cylinder means normally urging said linkage to its extended position and responsive to movement of said carrier arm forwardly of said neutral position to release said linkage for retraction thereof.

11. Vehicle washing apparatus for washing the vertical surface of a vehicle traveling along a predetermined path relative thereto and comprising:
support means;
carrier means mounted from said support means for travel forwardly and rearwardly along said path;
linkage means pivotally mounted on one end to said carrier means for rotation about an axis extending parallelly of said path and projecting vertically from said carrier means;
brush means;
brush mounting means for mounting said brush means from the extremity of said linkage means opposite said one end for rotation of said brush about a vertical axis, said mounting means including pivot means for rotating the axis of said brush means relative to the axis of said linkage means and being operative in response to rotation of said linkage means to maintain said brush axis substantially vertical as said linkage is pivoted about its said one end; and
drive means for maintaining said carrier arm normally projecting transversely of said path to dispose said brush means in said path and operative upon engagement of said brush means by one end of said vehicle to initiate forward movement of said carrier means from its normal position to enable said brush to move forwardly with said vehicle and to concurrently rotate said linkage means in one direction to retract said linkage and draw said brush to one side of said car path for washing of one side of said vehicle.

12. Vehicle washing apparatus as set forth in claim 11 wherein:
said carrier means is movable rearwardly of its normal position; and
said control means includes means responsive to said brush clearing said front corner of said vehicle to move said carrier means rearwardly beyond said normal position while rotating said linkage means in the direction opposite said one direction to extend said linkage and further responsive to the rear corner of said vehicle clearing said brush means to move said carrier means forwardly to carry said brush forwardly and inwardly across the rear of said vehicle.

13. Vehicle washing apparatus as set forth in claim 11 wherein:
said carrier means includes a horizontally projecting arm carried pivotally on one end from said support means and having said linkage means mounted from the free end thereof.

* * * * *